United States Patent [19]

Vescial

[11] Patent Number: 4,676,643
[45] Date of Patent: Jun. 30, 1987

[54] RING LASER GYRO READOUT ASSEMBLY SIMPLIFICATION WITH ADJUSTMENT CAPABILITY

[75] Inventor: Frederick Vescial, Orange, Calif.

[73] Assignee: Rockwell International Corporation, El Segundo, Calif.

[21] Appl. No.: 783,997

[22] Filed: Oct. 4, 1985

[51] Int. Cl.$^4$ .............................................. G01C 19/64
[52] U.S. Cl. .................................................... 356/350
[58] Field of Search .......................... 356/350; 372/94

[56] References Cited

U.S. PATENT DOCUMENTS 4,514,087 4/1985 Vescial ................................ 356/350
4,514,832 4/1985 Vescial ................................ 356/350

OTHER PUBLICATIONS

"Geometrical and Physical Optics", Second Edition, R. S. Longhurst, pp. 276-279.

Primary Examiner—Eugene R. LaRoche
Assistant Examiner—Robert J. Pascal
Attorney, Agent, or Firm—H. Fredrick Hamann; George A. Montanye; James F. Kirk

[57] ABSTRACT

A readout apparatus responsive to clockwise and counter-clockwise counter-rotating light beams that have a frequency difference relatable to the rate of rotation of a ring laser gyroscope, the readout apparatus comprising means for removing a portion of the light beams from the ring of the ring laser gyroscope; means for displacing the removed counter rotating beams to overlap a portion of the light of the removed beams to form a first spot beam having fringe motion characterized by an array of co-parallel alternating stripe regions of high and low intensity light within the spot; a mask having an array of co-parallel, rotated, alternating transparent and opaque stripes; the mask being positioned to direct the fringe motion of the spot beam through the mask, the mask array of alternating and opaque stripes being aligned to form a second spot beam having a moire fringe motion characterized by an array of co-parallel alternating stripe regions of high and low intensity light within the spot moving transverse to the fringer motion of the spot beam; means for receiving the second spot beam and for detecting the moire fringe motion within the second spot beam characterized by an array of co-parallel alternating stripe regions of high and low intensity light within the spot moving transverse to the fringe motion of the first spot beam.

16 Claims, 11 Drawing Figures

FIG. 6c

RING LASER GYRO READOUT ASSEMBLY SIMPLIFICATION WITH ADJUSTMENT CAPABILITY

RELATED CASES

U.S. Ser. No. 686,336, T. Howard, RING LASER GYRO DETECTOR LENS SYSTEM, Filed 12/26/84.

U.S. Pat. No. 4,514,832, F. Vescial, SINGLE MIRROR RING LASER GYRO READOUT WITHOUT COMBINING OPTICS, Issued 4/30/85.

U.S. Pat. No. 4,514,087, F. Vescial, RING LASER GYROSCOPE READOUT FOR PARTIALLY OVERLAPPING BEAMS, Issued 4/30/85.

BACKGROUND OF THE INVENTION

1. Field of the Invention

This invention relates to the field of inertial guidance and more particularly to the field of ring laser gyroscopes and to detector systems used by ring laser gyroscopes to detect rotational information from counter-propagating light beams.

2. Description of Prior Art

Detector systems used in ring laser gyroscope applications typically employ at least one partially transmissive mirror at locations in a resonant cavity through which components of a CW and a CCW beam are extracted. The beams are then combined using combining optics such as a prism. The combined beams are then directed onto a focal plane to form an illuminated spot in which interference patterns are characterized as areas of high and low intensity. As a ring laser gyroscope experiences an input body rate, the interference patterns move across the illuminated spot in response to the SAGNAC effect.

U.S. Pat. No. 4,514,832 titled "Single Mirror Ring Laser Gyro Readout Without Combining Optics", and U.S. Pat. No. 4,514,087 titled "Ring Laser Gyroscope Readout for Partially Overlapping Beams", each of these patents being issued on Apr. 30, 1985, and having a common inventor and assignee with this application, each characterize laser gyroscope detector systems different from this invention.

Conventional ring laser gyroscope detector systems position an array of two or more PIN diode detectors in the illuminated spot on the focal plane, the diode detectors being positioned and biased to sense and provide electrical signals in response to movement of the interference pattern across their surface. The electrical signals thus provided are amplified and conditioned to provide digital body rate information.

A conventional ring laser gyroscope readout detector system will typically have an illuminated spot size of greater than 0.020 inches and will use diodes of length greater than the spot size, width small compared to fringe spacing, and spacing in the 10 milli-inch range.

The diodes used are typically formed from semiconductor material such as doped silicon and typically are rectangular in shape. The size of the diode, the depth of the diffusion, the peak intensity of the illuminated spot and the separation of the interference patterns each combine to influence the detector system's signal to noise ratios and bandwidth.

Figures 1, 1A:
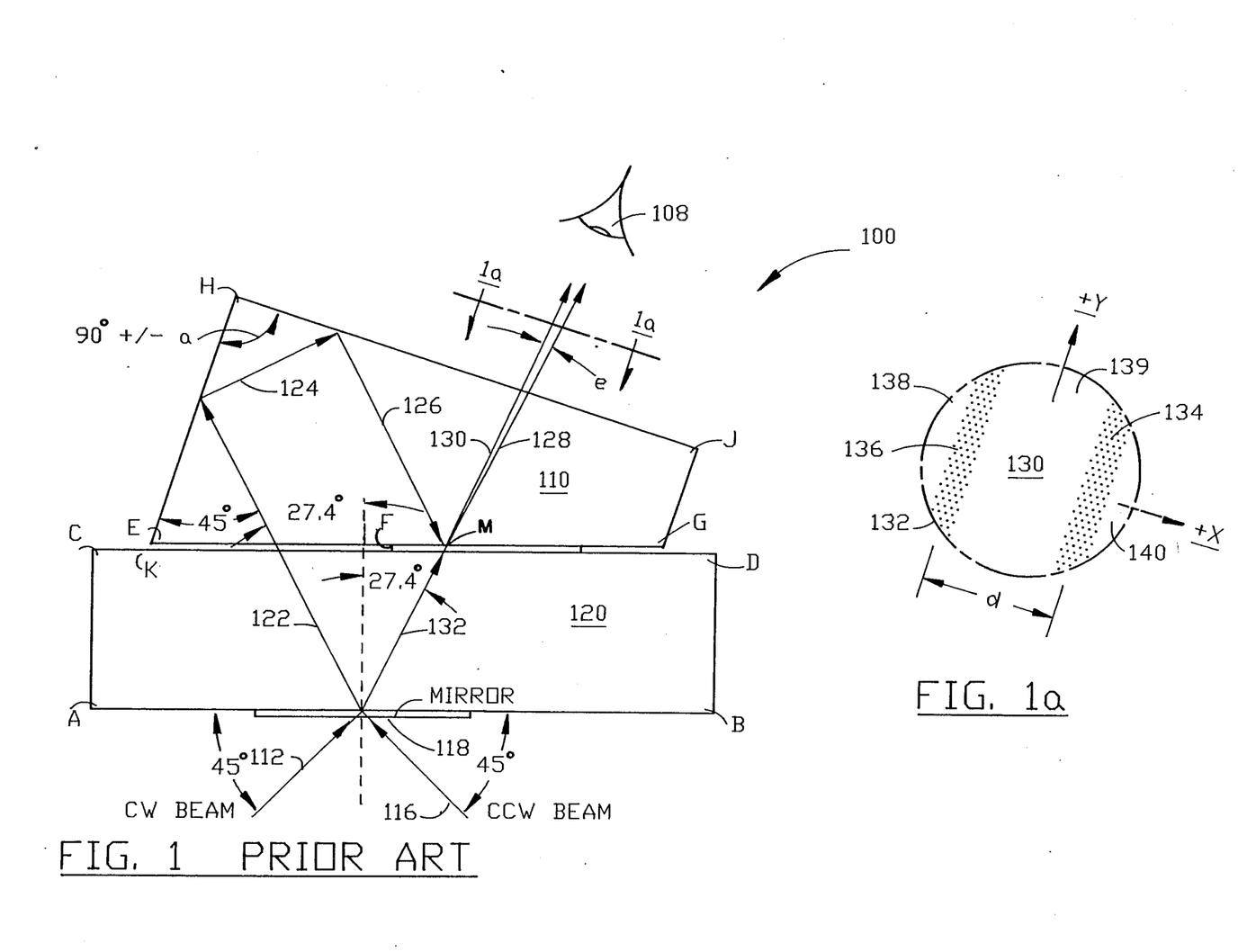

FIG. 1 shows a PRIOR ART prism and mirror arrangement for extracting a sample of the two counter-rotating beams from the cavity of an RLG. The optical elements shown include partially transmissive MIRROR 118 on substrate 120. A small percentage of the CCW (counter-clockwise) beam 116 passes through MIRROR 118 and is characterized as ray 122. A small percentage of the CW (clockwise) beam 112 passes through MIRROR 118 and is characterized as ray 132.

As shown in FIG. 1, the CW beam 132 passes through prism 110 without deviation as ray 128. The CCW beam 122 is totally internally reflected twice inside the prism before it impinges on a beam splitting coating on the surface between F and G. Angles shown are intended to be only illustrative of one particular embodiment, other combinations of angles being possible.

At the point of interception of ray 126 with beam splitting coating at FG, its reflection ray 130, makes a small angle with the transmitted CW beam 128. A small angle e is formed between the combined beams after they pass through prism surface HJ, and a fringe pattern is produced. Section line 1a—1a is taken through a sight plane as viewed by eye 108.

FIG. 1a depicts the image 130 of sight plane 1a—1a. Stippled (dotted) stripe regions 134, 136 are intended to characterize dark regions while regions 138, 139 and 140 are intended to characterize illuminated regions.

The dark stripes 132, 134 move laterally in a + or −x direction depending on the sense of the rotation rate of the gyro body. The dark stripes retain their co-parallel relationship in line with the y axis at all times.

The fringe spacing d is given by:

$$d = \lambda/e \text{ where}$$

$\lambda$ is the laser operating wave length and e is the angle between the two beams. With a zero input rate to the gyro, the fringe pattern of FIG. 1a is stationary. With a non-zero input rate, the fringe pattern moves at the gyro output beat frequency rate determined by its scale factor in either the + or −x directions dependent upon the sense of the input rotational rate.

Figure 2:
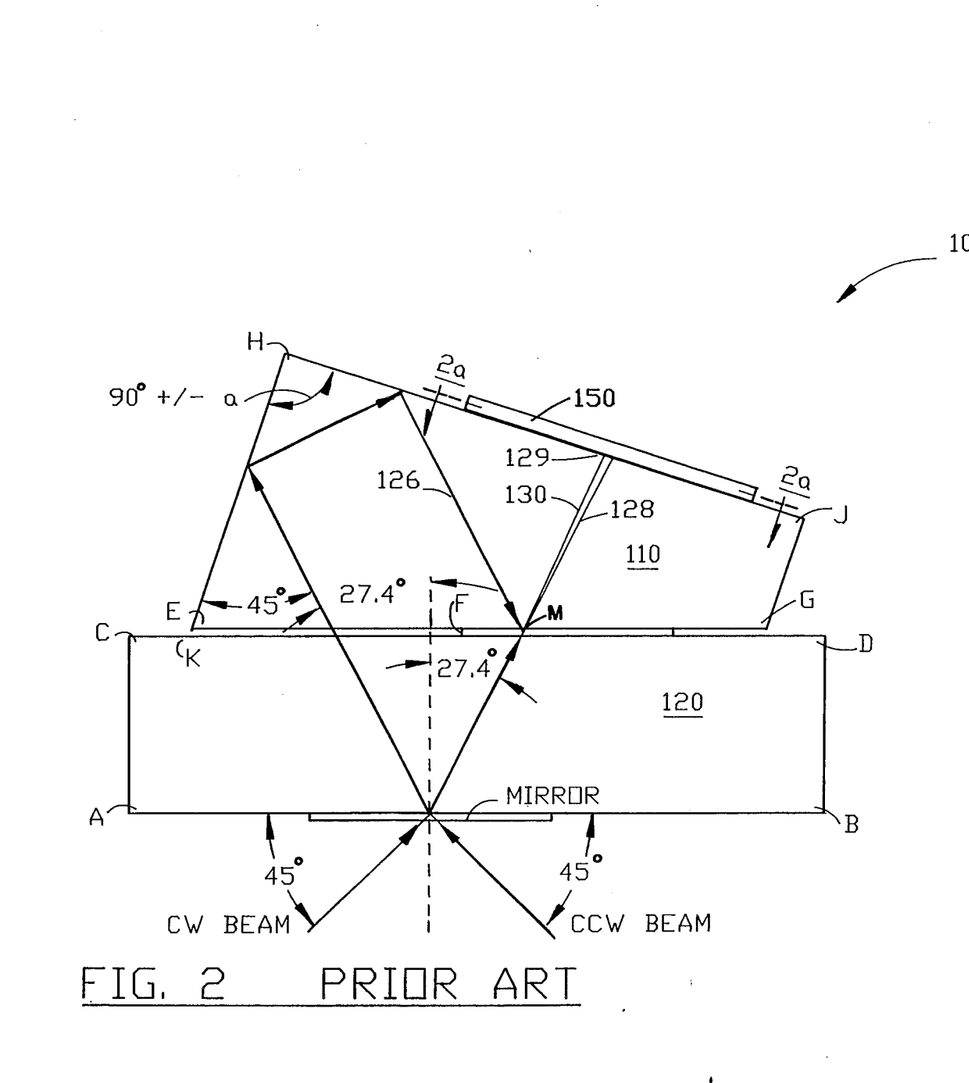
FIG. 2 is a ray tracing of the readout apparatus of FIG. 1 with a detector assembly shown.

Referring now to FIG. 2 shows the detector system of FIG. 1 with the addition of detector assembly 150 on surface HJ of PRISM 110.

Detector assembly 150 receives beams 128 and 130 through aperture 129 (not shown) as spot 130. Spot 130 is formed on the detector focal plane of section line 2a—2a.

Figure 2A:
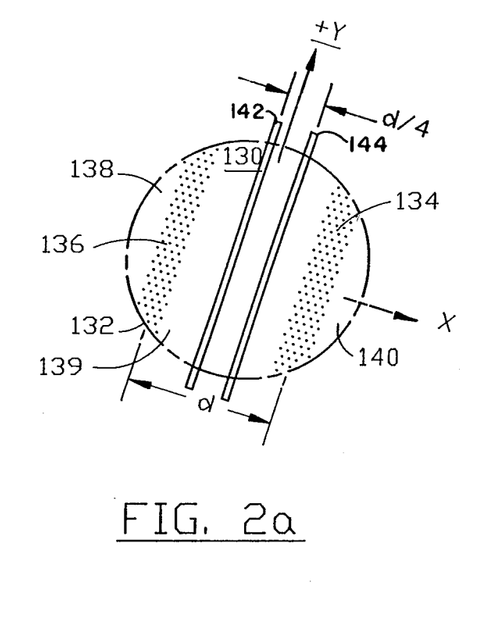
FIG. 2a is a view of the image on a focal plane formed by a plane taken on line 2a—2a through the detector assembly.

FIG. 2a shows SPOT 130 on the focal plane. Detectors 142 and 144 are shown formed on the focal plane of 2a—2a.

Detectors 142, 144 are co-parallel with each other and with striped regions 136, 134. Movement of these striped regions in the +x or −x direction is sensed by the detectors 142, 144 and amplified by respective amplifiers (not shown). The detectors are formed to contain bias circuitry for the detectors and noise amplifiers for the sensed signal within the detector system of enclosure 150.

The sense of the input body rate is determined from the signals from each of the two detectors by spacing the detectors 90 degrees apart on the fringe pattern as shown in FIG. 2. The phase relationship between the signals detected at detectors 142 and 144 is a function of time and the sense of the input body rate.

The phase relationship thus serves to indicate the direction of the fringe motion. Electronic circuits such as those characterized in an application, filed 1/14/83, by A. K. Dorsman, Ser. No. 457,845, titled "Apparatus for Increasing the Resolution of A Laser Gyroscope", under U.S. Patent Office Secrecy Order, and having a common assignee, are used to process the detector signals from diodes 142 and 144 and to produce pulses indicating angular rate and MODE pulses indicating the sense of rotational rate. This application is presently under Secrecy Order dated May 16, 1985 and is not otherwise classified.

The PRIOR ART systems of FIG. 2 typically require that very tight tolerances be imposed on the manufacture of SUBSTRATE 120 and PRISM 110. Assembly tolerances are also very critical. The cement joint of space DKEG is typically limited in angular deflection to less than five (5) arc seconds. These tight tolerances are necessary to achieve fringe spacing in the 0.050 inch range to permit convenient detector size and spacing d.

SUMMARY OF THE INVENTION

It is a major objective of this invention to provide a readout apparatus that permits fabrication and assembly of optical components with less restrictive tolerances than possible with PRIOR ART systems.

It is another object of this invention to provide a structure that permits adjustment to permit compensation for initial optical tolerance buildup prior to final assembly to compensate fringe spacing.

BRIEF DESCRIPTION OF THE DRAWINGS

FIG. 1 is a typical ray tracing through a PRIOR ART readout apparatus without a detector assembly.

FIG. 1a is a sight view of the image on a plane taken on section line 1a—1a.

FIG. 3a is view of a moire fringe pattern on the detector focal plane taken on section line 3a—3a.

DESCRIPTION OF THE PREFERRED EMBODIMENT

Figure 3:
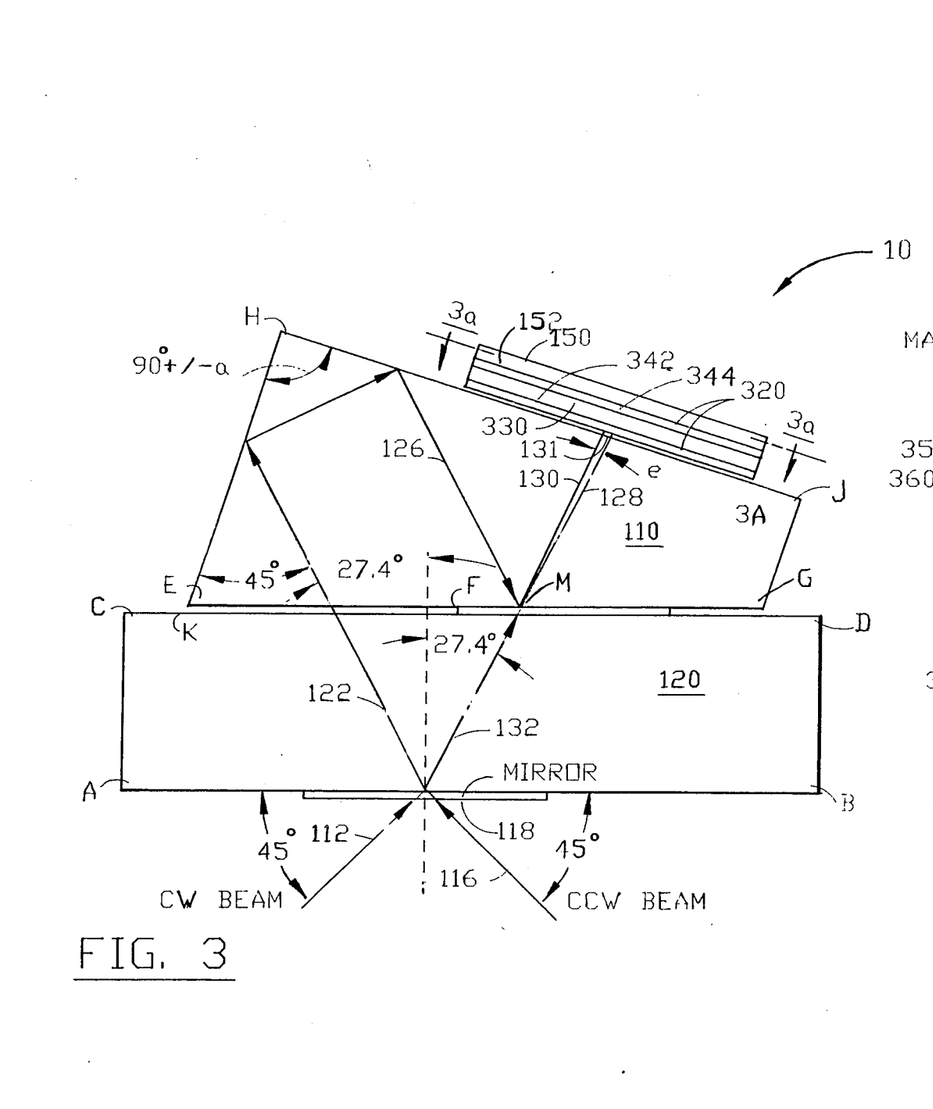
FIG. 3 is a ray tracing through the invention readout apparatus with a mask and detector included.

FIG. 3 shows the invention ring laser gyroscope readout apparatus 10 for mounting on a ring laser gyroscope body (not shown). A typical ring laser gyroscope has a resonant cavity in which counterpropagating light beams CW112 and CCW 116 propagate in a plane normal to the rate input axis of the ring laser gyroscope (normal to the plane of FIG. 3).

MIRROR 118 and SUBSTRATE 120 comprise a means for removing a portion of the light beams from the cavity of the ring laser gyroscope (not shown).

PRISM 110 comprises a means for displacing the removed counter rotating beams to overlap and form a first spot beam characterized by rays 128, 130 having fringe motion characterized by an array of co-parallel alternating stripe regions of high and low intensity light within the spot.

Figure 4:
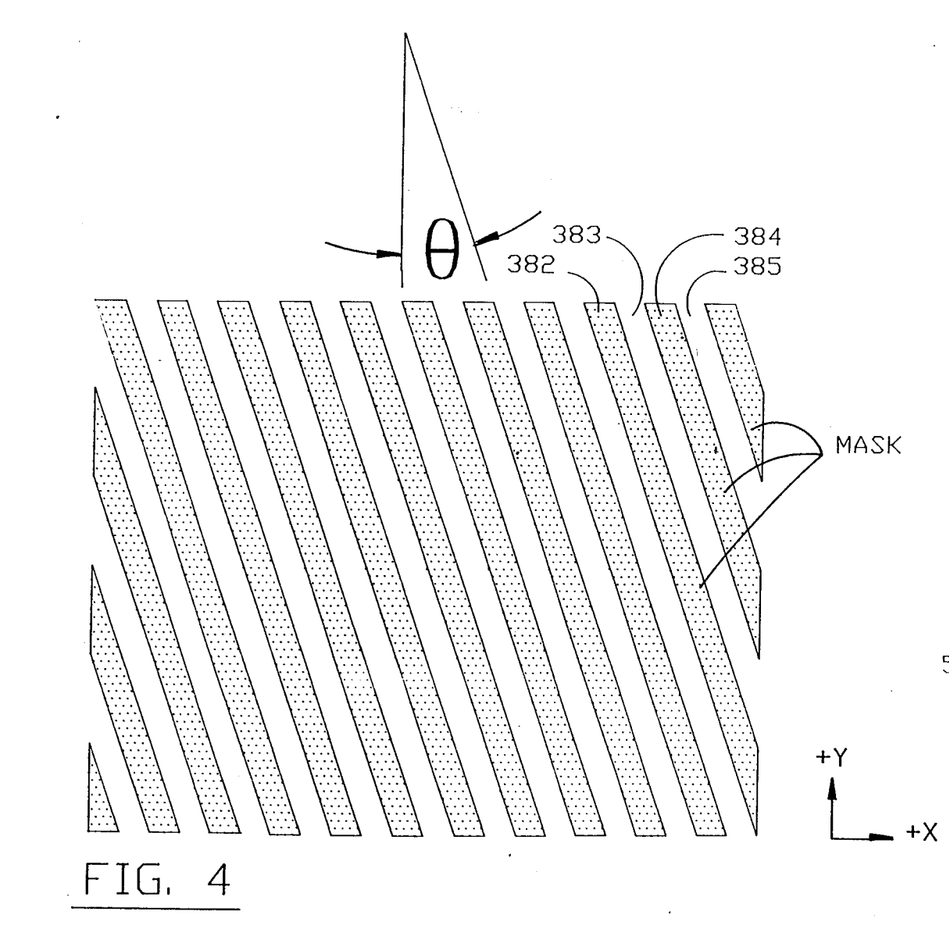
FIG. 4 is a view of a mask having an array of co-parallel, rotated, alternating transparent and opaque stripes deposited on a window which mounts on PRISM surface HJ.

FIG. 4 shows a mask having an array of co-parallel, rotated, alternating transparent and opaque stripes. The mask is positioned in FIG. 3 to direct the fringe motion of said spot beam 128, 130 through the mask. The mask array of alternating clear and opaque stripes is aligned to form a second spot beam (not shown) leaving the mask and having a moire fringe motion characterized by an array of co-parallel alternating stripe regions of high and low intensity light within the spot. The moire fringe pattern moves transverse (i.e. in the +/−y direction) to the fringe motion of the spot beam (i.e. in the +/−x direction).

The DETECTOR ASSEMBLY 150 of FIG. 3 represents a means for receiving the second spot beam and for detecting the moire fringe motion within the second spot beam characterized by an array of co-parallel alternating stripe regions of high and low intensity light within the spot beam.

Referring again to FIG. 3, the means for removing a portion of the light beams from the ring of the ring laser gyroscope is shown to further comprise a transmissive substrate 120 coupled to the body of the ring laser gyroscope (not shown). The transmissive substrate has spaced apart parallel inner and outer planar surfaces such as surface AB and CD.

A partially transmissive mirror 118 is formed on the substrate inner surface AB. The substrate is positioned on the optical path of the counter rotating beams to receive the CW and CCW beams at a first spot on the partially transmissive mirror 118. The mirror 118 transmits a portion of each beam as beams 122 and 132 through the mirror, and then through the transmissive substrate 120 of the means for displacing the removed counter rotating beams.

In the preferred embodiment of the invention, the transmissive substrate 120 is formed from a high optical quality material having a low thermal coefficient of expansion. An optical ceramic material such as ZERODUR by the JENA$^{ER}$ GLASSWERK SCHOTT & GEN company of MAINZ, GERMANY has been determined to be a preferred material for this application. The partially transmissive mirror 118 is typically a multilayer dielectric mirror such as the mirrors described in U.S. Pat. No. 4,142,958, titled "Method for Fabricating Multi-Layer Optical Films". Mirrored surfaces such as these are typically formed by the vacuum deposition of alternating layers of high and low refractive index material on the substrate surface AB.

FIG. 3 shows the means for displacing the removed counter rotating beams causing them to overlap and form a first spot beam having fringe motion characterized by an array of co-parallel alternating stripe regions of high and low intensity light within the first spot beam. The means for displacing further comprises an optical means such as PRISM 110. PRISM 110 is associated with, i.e. coupled mechanically to SUBSTRATE 120 on which the partially transmissive mirror surface 118 is formed. The PRISM is shown having a receiving surface EG positioned to receive the removed counter rotating light beams 132 and 122 from the MIRROR 118 and SUBSTRATE 120. Surface HJ of the PRISM is a transmitting surface.

The PRISM 110 has a corner reflector formed by inner surfaces EHJ for producing internal reflections that result in the beam displacement through small angle e as the combined beam passes through the PRISM transmitting surface HJ. Internal reflective surfaces EH and HJ are positioned to totally internally reflect a first of said removed counter rotating beams, such as the CCW beam component represented by ray 122 and to combine the removed first beam with a second removed counter-rotating beam, such as that represented by ray 132 at point M, located on the beamsplitting coating. The internal reflective surfaces and beamsplitting coating are used to produce the total internal reflection, the beam displacement, and overlap to form the first spot beam and to direct the combined beam 128, 130 through the transmitting surface HJ at 131.

FIG. 4 shows a typical mask such as that represented by layer 330 in FIG. 3 as being formed on a window mounted on the transmitting surface HJ as an array of rotated parallel stripes of alternating transparent and opaque regions. The mask layer 330 has mask receiving surface 342 and a mask transmitting surface 344.

FIG. 4 depicts the mask as having an array of co-parallel, rotated, alternating transparent and opaque stripes. The alternating stripes are formed to have alternating transparent and opaque stripes of essentially equal width. The mask of FIG. 4 is shown referenced to an XY coordinate system. The co-parallel stripes are shown rotated through angle THETA ($\theta$) with respect to the Y-AXIS of the coordinate system. The mask of FIG. 4 is typically formed on the window by photo lithographic deposition or by inserting a printed film as shown in FIG. 3. Layers 320 are intended to represent optional non-reflective isolater coatings.

The combined beam 128, 130 leaving PRISM transmitting surface HJ comprises a first spot beam and the combined beam leaving the transmitting surface 344 of the mask comprises a second spot beam (not shown). The means for receiving the second spot beam and for detecting the moire fringe motion within the second spot beam is characterized in FIG. 3 as detector 150.

Figure 3A:
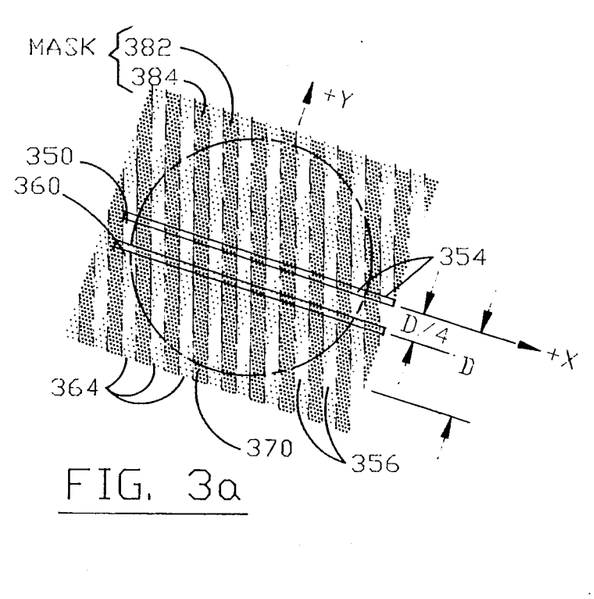

FIG. 3a is a view of the mask as seen from within the detector assembly 150 from section plane 3a—3a above the detectors looking past the detectors toward the mask transmitting surface 344. This view shows the detectors within Detector 150 as comprising at least first and second detectors such as those designated by reference numbers 350, 360. The detectors 350 and 360 are shown in FIG. 3a as being spaced apart by a distance, such as D/4. This distance corresponding to a fraction of the distance D between the co-parallel alternating stripe regions of high 352, 354, 356 and low 362, 364 intensity light within the second spot 370 moving transverse i.e. in the +/−Y direction) to the fringe motion within the first spot beam 128, 130.

The detectors are shown as being parallel and having a length greater than the largest dimension of the projected image of the co-parallel alternating stripe regions of high and low intensity light within the second spot moving transverse to the fringe motion of the first spot beam on the detectors.

Figure 5:
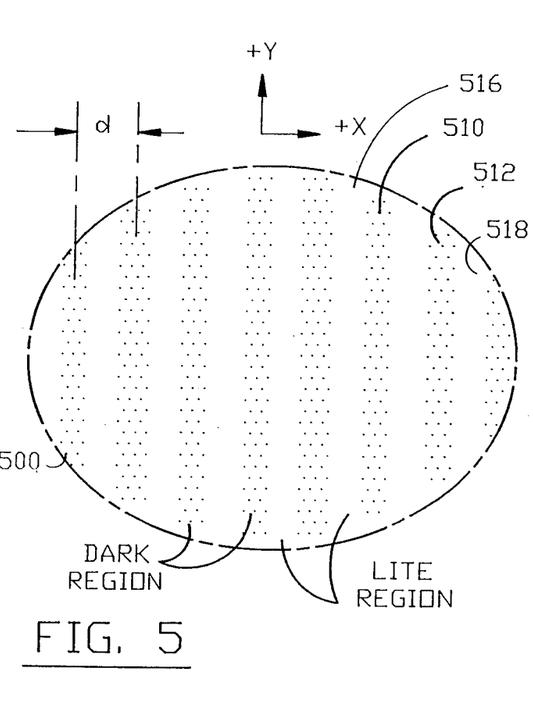
FIG. 5 is a view of the fringe pattern in a first elliptical spot beam formed by combined CW and CCW beams exiting PRISM surface HJ and prior to reaching the mask receiving surface.

FIG. 5 depicts a view of the fringe motion within the first spot beam 500 as viewed from the FIG. 3 mask receiving surface 342 looking at the PRISM transmitting surface HJ point 131. Dark regions 510, 512 are separated by light regions of high intensity light such as 516 and 518. The XY coordinates are in a plane co-parallel with the plane of PRISM surface HJ. For the purpose of the description of this embodiment, the +X axis is understood to be co-parallel with HJ and pointed toward the J corner of the PRISM 110.

Figure 6A:
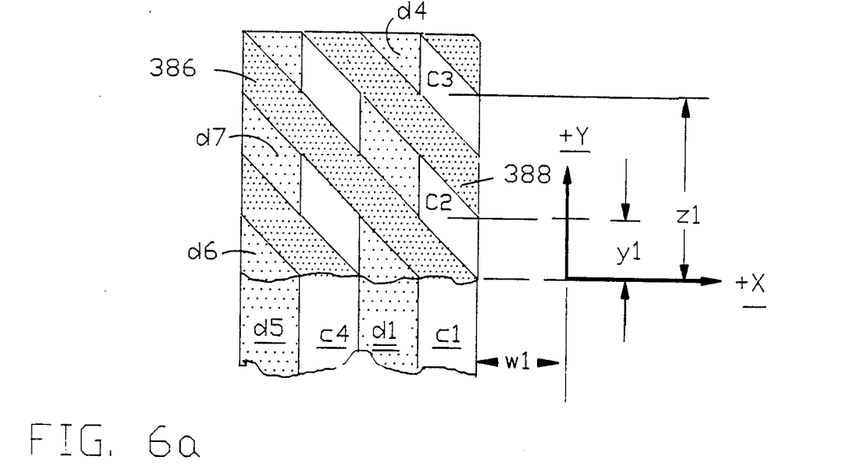
FIGS. 6a, 6b, 6c are views of the mask and the emerging moire fringe patterns in a second spot beam between the mask exit surface and the detector focal plane, each successive view shows progressive movement in the +Y direction of illuminated regions in response to progressive −X movement of the fringe pattern within the first spot beam striking the mask receiving surface.
Figure 6B:
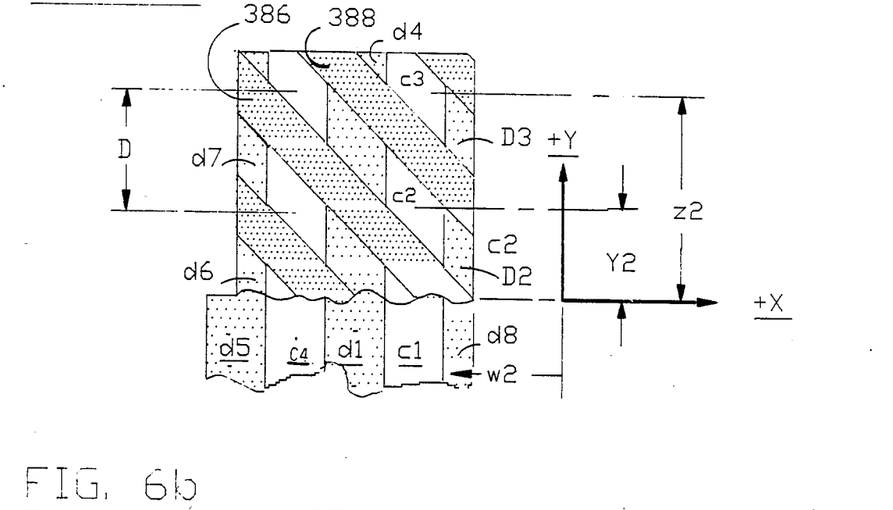
Figure 6C:
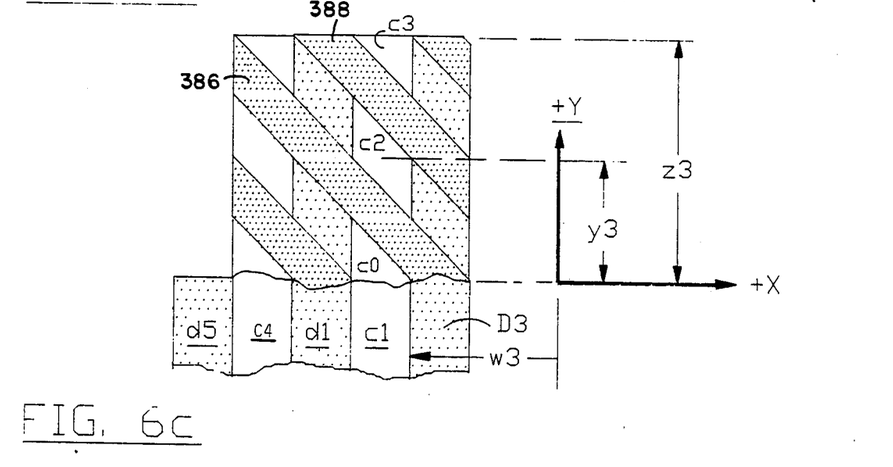

FIGS. 6a, 6b, and 6c depict the image projected past the mask 330 of FIGS. 3 and 4. Darker diagonal stripes 386 and 388 represent opaque mask regions as they did in FIG. 3a. These regions completely block all light from the combined beam. The moire fringe motion as depicted in FIGS. 6a–6c is shown as having an array of co-parallel alternating stripe regions of high and low intensity light within the second spot moving tranverse (i.e. vertically) to the fringe motion of the first spot beam. At least first and second detectors are included but not shown in FIGS. 6a–6c.

FIGS. 6a–6c are intended to show the relationship between the movement of alternating strip regions of high and low intensity light such as c3 and d4 within the second spot moving transverse (i.e. in the +Y direction) to the fringe motion of the first spot beam characterized by high intensity regions c1, c4 and low intensity regions d1, d5 moving in the −X direction. The first spot beam high intensity region c1 is observed to move laterally in the −X direction commencing from position w1 measured with respect to the coordinate reference system in FIG. 6a to position w2 in FIG. 6b and thence to position w3 in FIG. 6c. High intensity region c1 is responsible for illuminating regions c2 and c3 through the mask. As high intensity region c1 moves from position w1 to w2, second spot beam high intensity regions c2 and c3 are observed to translate laterally in the −X direction from position w1 to position w2 and concurrently to translate from respective Y positions y1, z1 to Y positions y2, z2. The movement of the second spot beam high intensity region c2 from position y1 to y2 represents a net motion in the +Y direction transverse to the lateral motion of the fringe pattern in the first spot beam.

FIG. 6c characterizes further movement of the fringe regions of high and low intensity within the first spot beam in a −X direction from a position w2 to w3. Second spot beam high intensity region c2 and c3 are observed to move laterally through the same displacement. Second spot beam high intensity regions c2 and c3 are observed to move vertically from positioned y2, z2 to positions y3, z3 affording an additional net motion in the +Y direction transverse to the −X lateral motion of the fringe regions within the first spot beam.

As the high and low intensity regions of the second spot beam are moved laterally in the −X direction, low intensity regions d7 and d6 are observed to move laterally to the left in accordance with the movement of the motion of the first spot beam low intensity region d5 beyond the window or aperture of FIG. 6c. Reversing the direction of motion of the fringe pattern of the first spot beam to move in the +X direction will cause the regions of high intensity in the second spot beam such as regions c2, c3 to translate in the +X direction and correspondingly, in the −Y direction transverse to the motion of the fringe pattern in the first spot beam.

OPERATION

FIG. 1 shows how samples of the two counter rotating beams 112, 116 are obtained at one corner of a ring laser gyro cavity and combined in a way to produce a fringe pattern shown in FIG. 1a whose motion in the +/−X direction is indicative of the gyro output. The optical elements shown in FIG. 1 are an output mirror 118 and a combining optics PRISM 110. As shown here, the CW beam sample passes through the prism without deviation while the CCW beam is totally internally reflected twice inside the prism before it impinges on a beam splitting coating on the surface of the mirror between FG, at which point its reflection makes a small angle with the transmitted CW beam sample 132. When the combined beams pass through the surface HJ, a fringe pattern is produced as shown in FIG. 1a. The fringe spacing d is given by λ/e, where λ is the laser operating wavelength and e is the angle between the two beams. With zero input rate to the gyro, the fringe pattern is stationary. With a non-zero input rate, the fringe pattern moves at the gyro output beat frequency rate determined by its scale factor in a direction orthogonal to the fringes. In FIG. 1a, the fringe motion is either in the +X direction or the −X direction dependent upon the sense of the input rotation rate to the gyro sensitive axis.

Two detectors are typically positioned to detect fringe motion in the beam as characterized in FIG. 2a. The detectors are typically positioned 90° apart on the fringe pattern as shown in FIG. 2a. The phase relationship between the signals detected by detector 142 and 144 as a function of time indicate the direction of fringe motion. An electronic system processes these signals to produce up and down pulses (corresponding to the two senses of rotational input) which can be counted. Ease in counting is facilitated if the phase difference between the detector signals is close to 90°. Other detector arrangements are also possible using more detector elements, but in any case, specific phase relationships between signals from various detectors are desirable.

The combining optics prism 110, as shown in FIG. 2, is typically attached to the output mirror substrate 120 with a thin layer (less than 0.001 inches in thickness) of optical cement which is cured when the prism is adjusted for proper beam 130, 128 overlap and fringe spacing d. The cement joint is indicated by the angle of FIG. 1 and FIG. 2 between surfaces EG and DK.

The usual design assumes that surfaces AB, CD, and EG are parallel to each other, so that the fringe spacing obtained is directly related to the prism corner angle deviation from 90° (+/−a) set by design, which is denoted by a. In particular, fringe spacing d equals λ/2n*a. The detector element spacing chosen is based upon this relationship. The quantity n is the index of refraction of the material from which the mirror substrate and prism are made.

In practice, surfaces AB and CD can be fabricated with sufficient closeness to parallelism, but the wedge angle introduced by the cement joint is difficult to control. One method of assembly is to use an optical contact between surface EG and DK, but this does not permit enough adjustment capability in placement of the prism 110 upon the substrate 120.

If a wedge angle is present in the cement joint, the spacing and orientation of the fringes shown in FIG. 2a as 138, 136, 139, 134 and 140 is different from the ideal situation considered above.

Fringes need not be orientated normal to the plane of FIG. 2 and move in an orthogonal direction contained in the plane. Since the detector array dimensions are fixed by design, it may be impossible to obtain the desired 90° phase shift between detector elements.

It is useful to consider magnitudes of certain readout geometry angles in order to point out the criticality of the cement joint. Typically, for a He-Ne laser operating at 6328 angstroms, the angle a is in the 30 arc seconds range to obtain fringe spacing in the 0.050 inch range. This permits a convenient detector array size and appropriate electronic signal amplitudes. The cement joint wedge should be small compared to 30 arc seconds. A five arc second cement wedge is the maximum that an error analysis will permit.

The point of innovation of this invention is that fringe spacing can be maintained in the 0.050 inch range which is convenient, while prism corner angle deviation from 90° can be enlarged by a factor of 10 or more, to the point where the cement joint wedge angle size is not critical. Ease in construction is thereby improved and costs reduced.

This invention proposes use of a moire fringe pattern of the type described in a text by R. S. Longhurst, titled "Geometrical and Physical Optics", Second Edition, pages 278 and 279. This text characterizes use of "two identical transmission gratings, each of which consists of alternate opaque and transparent elements of equal width. Then, if these gratings are placed face to face with their rulings inclined at a small angle and viewed against a bright background, no light will be transmitted where the opaque parts of one grating fall on the transparent parts of the other. The appearance is a set of dark fringes crossing at the gratings." This invention characterizes the use of a single grating in cooperation with the movement of a fringe pattern to produce a moire fringe effect.

Referring to FIGS. 3 and 3a, this invention, in contrast to the previous example, uses a prism at corner angle "a" deviation from 90° of 300 arc seconds or more, which will give a fringe spacing d of ten times or more than the value of approximately 0.050 inch arrived at in the previous example. The tolerance on the cement wedge angle is thus conveniently relaxed to 50 arc seconds or even greater.

A fringe pattern is obtained such as the pattern characterized in FIG. 5. This pattern of dark regions 510, 512 and light regions 516, 518 is analogous in function to the moving grating in the above reference by Longhurst. FIG. 4 represents a mask pattern characterized by layer 330 in FIG. 3 on surface HJ on prism 110. Layer 320 between mask 330 and the HJ surface of the prism is an optional anti-reflection isolater layer. As the combined first beam 128, 130 emerges from the HJ surface of prism 110 at 131 and passes through mask 330, the fringe pattern of FIG. 5 within the first beam passes through the mask of FIG. 4 to produce the moire fringe pattern of FIGS. 3a and 6a–6c.

The mask of FIG. 4 and the mask of FIG. 3a, 382, 384 has alternately opaque and transparent regions with the same periodicity as the fringe pattern within the first beam and which is characterized by the pattern of FIG. 5. The alternating opaque and transparent regions 382, 384; 383, 385 of the mask as characterized in FIG. 4 are rotated with an angle of THETA in relation to the X/Y coordinate system. The fringe pattern within the first beam is aligned with the Y axis of the X/Y coordinate system as shown in FIG. 5. The effect of the grating formed by the fringe pattern in the first beam and the grating of the mask positioned at an angle THETA with respect to the fringe pattern in the first beam is to produce a moire fringe pattern approximately orthogonal (i.e. in the +/−Y axis) direction to the gyro output fringe pattern motion (i.e. in the +/−X axis) direction, the moire fringe pattern having a spacing D as shown in FIG. 3a considerably larger than the gyro output fringe spacing d characterized in FIG. 5. With proper choice of THETA in FIG. 5, the distance D, shown in FIG. 3a and FIG. 6b can be adjusted to a value convenient for the fabrication of a detector array such as detectors 350, 360 in FIG. 3a. Detectors 350, 360 are conveniently spaced at a distance in the 0.010 inch range. As shown in FIG. 3a, the detector array 350, 360 is typically positioned approximately orthogonal to the movement of the fringe pattern in the first beam to expose the entire length of each detector to the moving parallel regions of high and low intensity 354, 356, and 364 within the moire fringe pattern.

I claim:

1. A readout apparatus responsive to clockwise and counter-clockwise counter-rotating light beams that have a frequency difference relatable to the rate of rotation of a ring laser gyroscope, said readout apparatus comprising:

means for removing a portion of the light beams from the ring of said ring laser gyroscope;

means for displacing the removed counter rotating beams to overlap a portion of the light of the removed beams to form a first spot beam having fringe motion characterized by an array of alternating regions of high and low intensity light within said spot;

a single mask having an array of co-parallel, alternating transparent and opaque stripes; said mask being positioned to be normal to said spot beam and to direct said fringe motion of said first spot beam through said single mask, said single mask array of alternating and opaque regions being aligned to form a second spot beam having a moire fringe motion characterized by an array of alternating regions of high and low intensity light within said spot moving transverse to said fringe motion within said first spot beam;

means for receiving said second spot beam and for detecting said moire fringe motion within said second spot beam characterized by an array of alternating regions of high and low intensity light within said second spot moving transverse to said fringe-motion of said first spot beam.

2. The readout apparatus of claim 1 wherein said means for removing a portion of the light beams from the ring of said ring laser gyroscope further comprises:

a transmissive substrate coupled to the body of said ring laser gyroscope, said transmissive substrate having spaced apart parallel inner and outer planar surfaces, and a partially transmissive mirror formed on said substrate inner surface, said substrate being positioned to receive the clockwise and counterclockwise counter rotating beams at a first spot on said partially transmissive mirror and to transmit a portion of each beam through said mirror, through said substrate to said means for displacing the removed counter rotating beams.

3. The readout apparatus of claim 2 wherein said transmissive substrate is formed from a high optical quality material having a low thermal coefficient of expansion and wherein said partially transmissive mirror is a multilayer dielectric mirror.

4. The readout apparatus of claim 2 wherein said means for displacing the removed counter rotating beams to overlap and form a first spot beam having fringe motion characterized by an array of co-parallel alternating stripe regions of high and low intensity light within said first spot beam further comprises:

optical means associated with said partially transmissive mirror surfaces having a corner reflector for producing said beam displacement.

5. The readout apparatus of claim 1 wherein said means for displacing the removed counter rotating beams to overlap and form a first spot beam having fringe motion characterized by an array of co-parallel alternating stripe regions of high and low intensity light within said first spot further comprises:

a prism means having a receiving surface positioned to receive said removed counter rotating light beams from said means for removing a portion of the light beams from the ring of said ring laser gyroscope, and a transmitting surface;

said prism means having internal reflective surfaces positioned to totally internally reflect a first of said removed counter rotating beams and to combine said removed first beam with a second removed counter-rotating beam, said internal reflective surfaces having a corner reflector for producing said total internal reflection, said beam displacement, and overlap to form said first spot beam and to direct said through said transmitting surface, said mask being formed on window mounted on said transmitting surface as an array of parallel stripes of alternating transparent and opaque regions.

6. The readout apparatus of claim 1 wherein said mask array of co-parallel rotated alternating transparent and opaque stripes is formed to have alternating transparent and opaque stripes of equal width.

7. The readout apparatus of claim 1 wherein said means for receiving said second spot beam and for detecting said moire fringe motion within said second spot beam characterized by an array of co-parallel alternating stripe regions of high and low intensity light within said second spot moving transverse to said fringe motion of said first spot beam further comprises:

at least first and second detectors, said detectors being spaced apart by a distance corresponding to a fraction of the distance between said co-parallel alternating stripe regions of high and low intensity light within said second spot moving transverse to said fringe motion of said first spot beam.

8. The readout apparatus of claim 1 wherein said means for receiving said second spot beam and for detecting said moire fringe motion within said second spot beam characterized by an array of co-parallel alternating stripe regions of high and low intensity light within said second spot moving transverse to said fringe motion of said first spot beam further comprises:

at least first and second detectors, said detectors being parallel and having a length greater than the largest dimension of the projected image of said co-parallel alternating stripe regions of high and low intensity light within said second spot moving transverse to said fringe motion of said first spot beam on said detectors, said detectors being spaced apart by a distance corresponding to approximately one-fourth the distance between said co-parallel alternating stripe regions of high and low intensity light within said second spot moving transverse to said fringe motion of said first spot beam.

9. A readout apparatus responsive to clockwise and counter-clockwise counter-rotating light beams that have a frequency difference relatable to the rate of rotation of a ring laser gyroscope, said readout apparatus comprising:

means for removing a portion of the light beams from the ring of said ring laser gyroscope;

means for displacing the removed counter rotating beams to overlap a portion of the light of the removed beams to form a first spot beam having fringe motion characterized by an array of alternating regions of high and low intensity light within said spot;

a single mask having an array of co-parallel, alternating transparent and opaque stripes; said mask being positioned to be normal to said spot beam and to direct said fringe motion of said first spot beam through said single mask, said single mask array of alternating and opaque regions being aligned to form a second spot beam having a moire fringe motion characterized by an array of alternating regions of high and low intensity light within said spot moving transverse to said fringe motion within said first spot beam, said alignment being rotationally adjusted on an axis coaxial with said spot beam to adjust the spacing of said high and low intensity light within said second spot beam to have predetermined separations;

means for receiving said second spot beam and for detecting said moire fringe motion within said second spot beam characterized by an array of alternating regions of high and low intensity light within said second spot moving transverse to said fringe motion of said first spot beam.

10. The readout apparatus of claim 9 wherein said means for removing a portion of the light beams from the ring of said ring laser gyroscope further comprises:

a transmissive substrate coupled to the body of said ring laser gyroscope, said transmissive substrate having spaced apart parallel inner and outer planar surfaces, and a partially transmissive mirror formed on said substrate inner surface, said substrate being positioned to receive the clockwise and counterclockwise counter rotating beams at a first spot on said partially transmissive mirror and to transmit a portion of each beam through said mirror, through said substrate to said means for displacing the removed counter rotating beams.

11. The readout apparatus of claim 10 wherein said transmissive substrate is formed from a high optical quality material having a low thermal coefficient of expansion and wherein said partially transmissive mirror is a multilayer dielectric mirror.

12. The readout apparatus of claim 10 wherein said means for displacing the removed counter rotating beams to overlap and form a first spot beam having fringe motion characterized by an array of co-parallel alternating stripe regions of high and low intensity light within said first spot beam further comprises:

optical means associated with said partially transmissive mirror surfaces having a corner reflector for producing said beam displacement.

13. The readout apparatus of claim 9 wherein said means for displacing the removed counter rotating beams to overlap and form a first spot beam having fringe motion characterized by an array of co-parallel alternating stripe regions of high and low intensity light within said first spot further comprises:

a prism means having a receiving surface positioned to receive said removed counter rotating light beams from said means for removing a portion of the light beams from the ring of said ring laser gyroscope, and a transmitting surface;

said prism means having internal reflective surfaces positioned to totally internally reflect a first of said removed counter rotating beams and to combine said removed first beam with a second removed counter-rotating beam, said internal reflective surfaces having a corner reflector for producing said total internal reflection, said beam displacement, and overlap to form said first spot beam and to direct said through said transmitting surface, said mask being formed on window mounted on said transmitting surface as an array of parallel stripes of alternating transparent and opaque regions.

14. The readout apparatus of claim 9 wherein said mask array of co-parallel rotated alternating transparent and opaque stripes is formed to have alternating transparent and opaque stripes of equal width.

15. The readout apparatus of claim 9 wherein said means for receiving said second spot beam and for detecting said moire fringe motion within said second spot beam characterized by an array of co-parallel alternating stripe regions of high and low intensity light within said second spot moving transverse to said fringe motion of said first spot beam further comprises:

at least first and second detectors, said detectors being spaced apart by a distance corresponding to a fraction of the distance between said co-parallel alternating stripe regions of high and low intensity light within said second spot moving transverse to said fringe motion of said first spot beam.

16. The readout apparatus of claim 9 wherein said means for receiving said second spot beam and for detecting said moire fringe motion within said second spot beam characterized by an array of co-parallel alternating stripe regions of high and low intensity light within said second spot moving transverse to said fringe motion of said first spot beam further comprises:

at least first and second detectors, said detectors being parallel and having a length greater than the largest dimension of the projected image of said co-parallel alternating stripe regions of high and low intensity light within said second spot moving transverse to said fringe motion of said first spot beam on said detectors, said detectors being spaced apart by a distance corresponding to approximately one-fourth the distance between said co-parallel alternating stripe regions of high and low intensity light within said second spot moving transverse to said fringe motion of said first spot beam.

* * * * *

Notice of Adverse Decision in Interference

In Interference No. 101,910, involving Patent No. 4,676,643, F. Vescial, RING LASER GYRO READOUT ASSEMBLY SIMPLIFICATION WITH ADJUSTMENT CAPABILITY, final judgment adverse to the patentee was rendered June 22, 1989, as to claims 1-16.

[*Official Gazette September 19 ,1989.*]